(12) United States Patent
Zhang et al.

(10) Patent No.: US 8,732,110 B2
(45) Date of Patent: May 20, 2014

(54) METHOD AND DEVICE FOR CLASSIFYING A PACKET

(71) Applicant: Huawei Technologies Co., Ltd., Guangdong (CN)

(72) Inventors: Wenyong Zhang, Guangdong (CN); Jun Gong, Guangdong (CN); Shuying Liu, Guangdong (CN); Hongfei Chen, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/724,797

(22) Filed: Dec. 21, 2012

(65) Prior Publication Data

US 2013/0166491 A1 Jun. 27, 2013

Related U.S. Application Data

(63) Continuation of application No. PCT/CN2010/074575, filed on Jun. 28, 2010.

(51) Int. Cl.
*G06N 5/02* (2006.01)
*H04L 12/741* (2013.01)

(52) U.S. Cl.
USPC .......................................................... 706/47

(58) Field of Classification Search
CPC . G06F 17/30705; H04L 45/74; H04L 45/745; H04L 45/7453; H04L 45/7457; H04L 45/748; H04L 47/2441; H04L 69/22; H04L 63/0227; H04L 43/18
See application file for complete search history.

(56) References Cited

U.S. PATENT DOCUMENTS

| | | | |
|---|---|---|---|
| 7,039,641 B2 | 5/2006 | Woo | |
| 2010/0192215 A1 | 7/2010 | Yaxuan et al. | |

FOREIGN PATENT DOCUMENTS

| | | |
|---|---|---|
| CN | 1992673 A | 7/2007 |
| CN | 1992674 A | 7/2007 |
| CN | 101345707 A | 1/2009 |
| CN | 101478551 A | 7/2009 |
| WO | WO 2009/145712 A1 | 12/2009 |

OTHER PUBLICATIONS

Yeim-Kuan Chang, et al., "A High-Speed and Memory Efficient Pipeline Architecture for Packet Classification", 2010 18th IEEE Annual International Symposium on Field-Programmable Custom Computing Machines, May 2, 2010, p. 215-218.*
Search Report dated Feb. 21, 2013 in connection with Chinese Patent Application No. 2010800026020.
Partial translation of Office Action dated Mar. 5, 2013 in connection with Chinese Patent Application No. 201080002602.0.
Ning, Zhuo, et al., "Packet classification algorithm based on the maximum feature entropy used in GIDS", Journal of Xidian University, vol. 34, Sep. 2007, 6 pages.

(Continued)

*Primary Examiner* — Jeffrey A Gaffin
*Assistant Examiner* — Paulinho E Smith

(57) ABSTRACT

A method and a device for classifying a packet, in the field of communications technologies, are provided to reduce rule duplication in a classification process and improve classification efficiency. The method classifies a packet by receiving a packet; searching for a rule matching the packet in at least one created decision tree (created after an original rule set is divided based on a segmentation code); and classifying the packet according to a found rule. The method and the device may be applicable to a router.

14 Claims, 4 Drawing Sheets

(56) References Cited

OTHER PUBLICATIONS

Gao, Lei, et al., "Survey and Evaluation of IP Packet Classification Algorithms", Computer Engheering & Science, vol. 28, No. 3, Mar. 28, 2006, p. 70-105.
Dingxin Zhang, "Research on Packet Classification Algorithm", The PLA Information Engineering University, Mar. 2003, 53 pages.
International Search Report dated Apr. 7, 2011 in connection with International Patent Application No. PCT/CN2010/074575, 4 pages.
Written Opinion of the International Searching Authority dated Apr. 7, 2011 in connection with International Patent Application No. PCT/CN2010/074575.
Thomas Y.C. Woo, A Modular Approach to Packet Classification: Algorithms and Results, IEEE INFOCOM 2000, p. 1213-1222.
Kai Zheng, et al., "Parallel Packet Classification via Policy Table Pre-Partitioning", IEEE Globecom 2005, p. 73-78.
Supplementary European Search Report dated Jun. 5, 2013 in connection with European Patent Application No. EP 10 84 2861.
Motasem Abdelghani, et al., "Packet Classification Using Adaptive Rules Cutting (ARC)", Proceedings of the Advanced Industrial Conference on Telecommunications/Service Assurance with Partial and Intermittent Resource Conference/E-Learning on Telecommunications Workshop, Jul. 17, 2005, pp. 28-33.
Weirong Jiang, et al., "Scalable Packet Classification: Cutting or Merging?", IEEE 2009, Aug. 3, 2009, 6 pages.

\* cited by examiner

METHOD AND DEVICE FOR CLASSIFYING A PACKET

CROSS-REFERENCE TO RELATED APPLICATIONS

This application is a continuation of International Application No. PCT/CN2010/074575, filed on Jun. 28, 2010, which is hereby incorporated by reference in its entirety.

FIELD OF THE INVENTION

The present invention relates to the field of communications technologies, and in particular to a method and a device for classifying a packet.

BACKGROUND OF THE INVENTION

Traffic classification refers to the classification of the received packet, which is one of key functions of a router and provides technical support for complicated value-added services of the router such as network security, QoS (Quality of Service, quality of service), load balancing and traffic counting.

A basic idea of a traffic classification method based on a decision tree is as follows: a rule set is recursively divided through a certain segmentation policy, till the number of rules in each sub-rule set is less than a preset Bucket Size (bucket size); and a decision tree may be created through segmentation, in which an intermediate node of the decision tree stores a method for segmenting the rule set, leaf nodes store the sub-rule sets, that is, the leaf nodes store all possible matching rules.

During the classification of the received packet, related domains are first extracted from packet headers to form keywords, and then the created decision tree is traversed with the keywords and the keywords are compared with the rules in the leaf nodes, and finally, rules with the highest priority and matching the packet may be obtained. Algorithms based on the decision tree include HiCuts (one-dimensional segmentation), HyperCuts (multi-dimensional segmentation) and Modular (bit-selection segmentation).

However, in the traffic classification methods based on the decision tree, because wildcards '*' exist in the rule, it is hard to avoid rule duplication, resulting in problems such as growing memory usage and low segmentation efficiency.

For the above problems, in the prior art, a solution to improving the traffic classification method based on the decision tree is as follows: first, an original rule set is divided into several non-overlapping sub-rule sets, and then the decision tree is created with the obtained sub-rule sets.

A process of dividing the original rule set into several sub-rule sets may be implemented in the following manners:

1) classifying the rule set according to a prefix, for example, during the classification of standard Ipv4 quintuple rules, the rules may be classified according to a prefix of a source IP and/or a destination IP address therein; and 2) classifying the rules according to a range, for example, during the classification of the standard Ipv4 quintuple rules, the rules may be classified according to a range of a source port and/or a destination port.

If the original rule set is divided with respect to merely one domain, the subclasses obtained in the manners 1) and 2) are the required sub-rule sets. If multiple domains exist in the original rule set, for example, it is possibly required to divide the Ipv4 quintuple rules with respect to 5 domains; and at this time, subclasses obtained by using different classification methods may be formed into different combinations according to an intersection product method, and then multiple non-overlapping sub-rule sets are obtained. If the original rule set is divided according to one address domain and one port domain, first, the original rule set may be divided into s1 subclasses and s2 subclasses respectively by using the methods described in the manners 1) and 2), and then the original rule set may be divided into s1*s2 sub-rule sets by using the intersection product method.

By using the improved traffic classification algorithm based on the decision tree, the original rule set may be divided into "fully" non-overlapping sub-rule sets, which reduces rule duplication at a certain degree. However, in a process of classifying the packet by using the above improved traffic classification algorithm, the inventors find that the prior art at least has the following problems.

The rule duplication occurs in dependence on whether the wildcards "*" exist at bits for segmentation in the rule during the segmentation, not on whether domains of the rules overlap. Therefore, the above solution is merely applicable to the traffic classification algorithm for segmentation fully according to the domain.

SUMMARY

Embodiments of the present invention provide a method and a device for classifying a packet, so as to reduce rule duplication in a classification process, and improve classification efficiency.

To achieve the above objectives, the embodiments of the present invention adopt the following technical solutions.

A method for classifying a packet includes:

receiving a packet;

searching for a rule matching the packet in at least one created decision tree, in which the decision tree is a decision tree created after an original rule set is divided based on a segmentation code; and classifying the packet according to a found rule.

A device for classifying a packet includes:

a receiving unit, configured to receive a packet;

a searching unit, configured to search for a rule matching the packet in at least one created decision tree, in which the decision tree is a decision tree created after an original rule set is divided based on a segmentation code; and a classification unit, configured to classify the packet according to a found rule.

In the method and device for classifying the packet provided by the embodiments of the present invention, because the decision tree used in the rule searching process is a decision tree created after the original rule set is divided based on the segmentation code, the use of the segmentation code to divide the rule set may not only reduce the rule duplication, but also greatly decrease depth of the decision tree, memory usage and tree creation time. Therefore, when the rule is searched for by using the solution provided by the embodiments of the present invention, the speed of the processing such as searching and classifying may be greatly improved with searching bandwidth remaining unchanged. Compared with the prior art, the method and the device provided in the embodiments of the present invention may reduce rule duplication during a classification process and improve classification efficiency.

BRIEF DESCRIPTION OF THE DRAWINGS

To illustrate the technical solutions according to the embodiments of the present invention or in the prior art more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

In a traffic classification process based on a decision tree, the number and positions of wildcards '*' (refers to that a certain binary bit is '*') in a rule determine whether rule duplication is likely to be caused in a process of creating a decision tree.

Figure 1A:
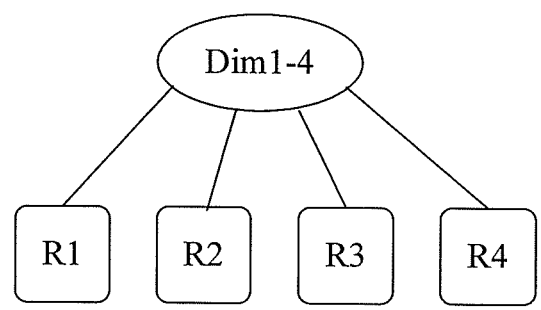
FIG. 1A and FIG. 1B are schematic segmentation diagrams of a rule set.
Figure 1B:
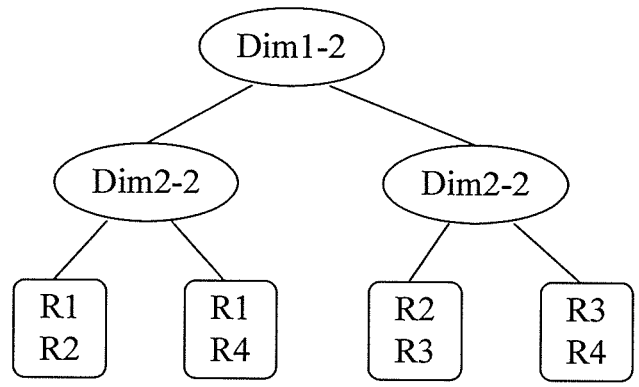

The case of rule duplication caused by different numbers of the wildcards '*' is described in the above, and here an effect of the position of '*' on rule duplication is illustrated. In two examples shown in Table 1 and Table 2, the number of the wildcards '*' is the same, while the positions of the wildcards in the rules are different. In Table 1, because the positions of the wildcards '*' are completely the same in the four rules, when the rule set in Table 1 is segmented, it is merely required to select the first two bits on a first dimension (Dim1) to segment the rule set into four sub-rule sets, in which each sub-rule set includes one rule and no rule duplication is performed, as shown in FIG. 1A. The wildcards '*' exist in the rules of Table 2 in a cross manner, and at this time, rule duplication is caused in selecting any bit for segmentation. For example, when a first bit on a first dimension (Dim1) and a first bit on a second dimension (Dim2) are selected for segmentation, the rule set in Table 2 may be segmented into four sub-rule sets, in which each sub-rule set includes 2 rules, as shown in FIG. 1B. It can be seen from the above that, although the number of the wildcards '*' is the same in the two examples shown in Table 1 and Table 2, the degrees of rule duplication are far different from each other.

TABLE 1

| Rules | Dim1 | Dim2 |
|-------|------|------|
| R1    | 00*  | *    |
| R2    | 01*  | *    |
| R3    | 10*  | *    |
| R4    | 11*  | *    |

TABLE 2

| Rules | Dim1 | Dim2 |
|-------|------|------|
| R1    | 00*  | *    |
| R2    | *    | 01*  |
| R3    | 10*  | *    |
| R4    | *    | 11*  |

For a rule set, if the selection of some bits for segmentation does not cause duplication, it is regarded that the rules in the rule set match; and if the selection of any bit for segmentation causes the duplication, it is regarded that the rules in the rule set do not match. In the example corresponding to FIG. 1A and FIG. 1B, the four rules in Table 1 match, while the four rules in Table 2 do not match. Moreover, for matching rules, during segmentation, the more selective bits not causing duplication are, the higher a degree of matching each other is, and then it is more unlikely to cause the duplication in a process of creating the decision tree. To better describe the matching among the rules, rule segmentation is introduced in the following.

First, each rule is regarded as a three-value bit string formed by '0', '1' and '*'. If the bit string corresponding to each rule is divided into N (N≥2) segments and '*' in each segment is counted and the number of '*' is obtained, the number of '*' in the segment determines whether the rule is likely to be duplicated when bits in the segment are used for segmentation. When the number of '*' in a certain segment of a rule exceeds a specific threshold t (for example, a segment of rule includes 16 bits of characters, and when the number of '*' exceeds 8), it may be regarded that the bits in the segment are "bad" for the rule, that is, when the bits in the segment are used for segmentation, the rule is likely to be duplicated or has a great trend to be duplicated; otherwise, it is regarded that the bits in the segment are "good" for the rule. By making statistics of "good" segments and "bad" segments in each rule, the number and the positions of '*' in each rule may be roughly understood, according to which the rule set is divided.

Specifically, each rule is a three-value bit string formed by '0', '1' and '*', that is, each rule includes multiple bits of characters formed by '0', '1' and '*'. At least two bits of characters are used as one segment to divide the bit string corresponding to each rule into N segments. When the number of '*' in a certain segment exceeds a specific threshold t, the segment is regarded to be "bad" and encoded into 0; otherwise, the segment is regarded to be "good" and encoded into 1. In this way, each rule corresponds to one N-bit binary code, which is referred to as a segmentation code.

The technical solution of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 2:
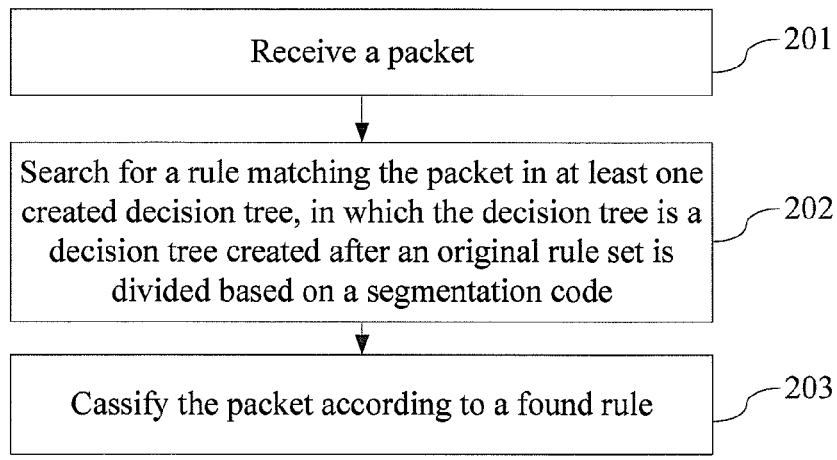
FIG. 2 is a flow chart of a method for classifying a packet in Embodiment 1 of the present invention.

As shown in FIG. 2, a method for classifying a packet according to the embodiment of the present invention includes the following steps:

Step 201: Receive a packet.

A router may receive multiple packets from a network, and a traffic classifier then checks multiple domains in the packet, so as to search for a rule matching the packet.

Step 202: Search for a rule matching the packet in at least one created decision tree, in which the decision tree is a decision tree created after an original rule set is divided based on a segmentation code.

When the decision tree created after the original rule set is divided based on the segmentation code is created, the number and position of '*' are taken into consideration at the same time. Compared to a decision tree created by using a method in the prior art, the decision tree of the present invention results in fewer cases of rule duplication, and moreover, the depth of the decision tree of the present invention is less than that of the decision tree in the prior art. Therefore, through the decision tree created after the original rule set is divided based on the segmentation code in this embodiment, time for searching for the rule matching the packet may be shortened, and the classification efficiency is improved.

Step 203: Classify the packet according to a found rule.

In step 203, it may be regarded that the packet matching the same rule all belong to the same type, and the processing manners for packets of different types may be different. For example, the processing may be discarding, accepting or counting.

In this embodiment, an execution subject of the above steps may be a router or a traffic classification engine integrated inside the router.

In the method for classifying the packet provided by the embodiment of the present invention, because the decision tree used in the rule searching process is a decision tree created after the original rule set is divided based on the segmentation code, the use of the segmentation code to divide the rule set may not only reduce the rule duplication, but also greatly decrease the depth of the decision tree, memory usage and tree creation time. Therefore, when the rule is searched for by using the solution provided by the embodiment of the present invention, the speed of the processing such as searching and classifying may be greatly improved with searching bandwidth remaining unchanged.

Embodiment 2

A method for classifying a packet according to the embodiment of the present invention is described in detail below through a specific embodiment. Before the detailed description of the implementation process of the method, the following concepts may be introduced:

1) It can be seen from the above description that, a segmentation code is an N-bit binary code determined according to the number and position of '*' in the rule. Specifically, each rule includes multiple bits of characters formed by '0', '1' and '*' and at least two bits of characters are used as a segment to divide a bit string corresponding to each rule into N segments When the number of '*' in a certain segment exceeds a specific threshold t, the segment is regarded to be "bad" and is encoded into 0; otherwise, the segment is regarded to be "good" and is encoded into 1. In this way, each rule corresponds to one N-bit binary code, which is referred to as a segmentation code.

In actual rules, for example, in Ipv4 quintuple rules, each domain may be indicated by a prefix or a range. A source IP address and a destination IP address are naturally indicated by the prefix; a protocol number may be regarded as a prefix in which a mask length is 0 (the domain is '*') or 8; and a port number is indicated by the range.

For the prefix, it may be judged whether a corresponding character segment is "good" or "bad" through the mask length. For example, for an IP address including a 32-bit binary code, 16 bits are used as a segment, and then the source IP may be divided into two segments, and corresponding two binary bits are used as a segmentation code thereof. When the number of '*' in one segment exceeds 8, the segment is regarded to be "bad". In this way, when a mask length of a source IP of a certain rule satisfies maskLen<8, two binary bits in the segmentation code corresponding to the source IP are 00. When 8≤maskLen≤24, the code is 10; and when maskLen≥24, the code is 11.

For the range, it is judged whether a certain segment is "good" or "bad" through the length of the range. Normally, an upper limit and a lower limit of the range (for example, a protocol number) are both a 16-bit binary number. A range domain may be used as a segment, and if the length of a certain range is greater than a threshold L, the segment is regarded to be "bad" and is encoded into 0; otherwise, the segment is regarded to be "good" and is encoded into 1. Preferably, L corresponds to a threshold t of the number of in the prefix, and a relation thereof is $t=\log_2 L$, thereby facilitating the calculation of a minimum matching level of the sub-rule sets.

During segmentation, a length and a threshold of each segment may not be the same. For example, for the Ipv4 standard quintuple rules, every 16 bits in the source IP and the destination IP is divided as a segment, and therefore the source IP and the destination IP are divided into two segments respectively, in which a threshold of the number of '*' is 8. A source port and a destination port are indicated by the range, and are used as a segment respectively, in which a threshold of the range length is 256. A protocol number is indicated by a 8-bit binary code, and is used as a segment, in which a threshold of the number of '*' is a positive integer (corresponding to two cases of a specific protocol number and '*') less than 8. In this way, the rule is divided into 7 segments, and a segmentation code is indicated by a 7-bit binary number.

2) If a result of two segmentation codes after a bit-by-bit AND operation (AND operation) is 0, it indicates that the two segmentation codes do not match; otherwise, it indicates matching. The segmentation codes matching each other are referred to as matching segmentation codes.

After performing the bit-by-bit AND operation on the two matching segmentation codes, the number of '1' in the result indicated as the binary number is defined as a matching level of the two segmentation codes.

For example, two segmentation codes A and B are arbitrarily taken. If (A&B)=0, A and B do not match; otherwise, A and B match, and the matching level=the number of '1' in (A&B) indicated as the binary number. For the segmentation codes that do not match, it is also regarded that the matching level thereof is 0. If the segmentation codes A and B match, it is regarded that A is a matching segmentation code of B, and meanwhile B is a matching segmentation code of A. The higher the matching level between the segmentation codes is, the more easily the combined rules associated with the segmentation codes are segmented, that is, the smaller the trend of duplication occurring in the rule segmentation performed by using the segmentation codes is.

3) During the rule set division performed by using the segmentation codes, it is required to first select a segmentation code, and then the matching level between the segmentation code and each of other segmentation codes is calculated; and the segmentation codes are classified according to the matching levels. Here, the selected segmentation code is referred to as a seed segmentation code.

After the selection of the seed segmentation code, the matching level between each of other segmentation codes and the seed segmentation code is calculated. After the calculation of the matching levels, a priority order may be set for each segmentation code, and a manner thereof is as follows:

(1) the higher the matching level is, the higher the priority is; and (2) if the matching levels are the same, the larger the corresponding number of the rules is, the higher the priority is.

4) A result obtained after a continuous bit-by-bit AND operation on multiple segmentation codes in sequence is referred to as a common matching segmentation code of these segmentation codes.

For example, multiple segmentation codes A, B, C and D exist, during the calculation of a common matching segmentation code of the four segmentation codes, it is required to first perform the bit-by-bit AND operation on A and B, and then perform the bit-by-bit AND operation on a bit-by-bit AND result of A and B, and C; and so forth, thereby obtaining the common matching segmentation code of A, B, C and D.

Assuming that the rules corresponding to N segmentation codes are formed into a sub-rule set S, a common matching segmentation code of the N segmentation codes reflects a matching degree between the rules in S. The larger the number of '1' in the common matching segmentation code is, the higher the matching degree between the rules in S is; and the more bits exist for selection during the segmentation of S without causing the rule duplication likely.

Meanwhile, the common matching segmentation code reflects the bits which are unlikely to cause the rule duplication when selected for segmentation in creating a decision tree for the sub-rule set. If one bit in the segmentation code is 1, a segment corresponding to the bit includes K bits of characters, and a threshold of the number of '*' used to judge whether the segment is "good" or "bad" is t, when the rule set is segmented by using the first (k-t) bits in the segment, the rule duplication is not likely to be caused. In a Modular algorithm, the first (k-t) bits in a segment corresponding to a bit being 1 in the common matching segmentation code may be used to establish a more effective jump table (jump table). During bit selection, the bits that are not likely to cause the rule duplication may be selected preferentially. In HiCuts and HyperCuts algorithms, bits in a dimension (corresponding to some segments) that are not likely to cause the rule duplication may be selected preferentially according to the common matching segmentation code for segmentation, thereby making the segmentation more effective.

Based on the above basic concepts, the method for classifying the packet provided in this embodiment is described in detail in the following.

Figure 3:
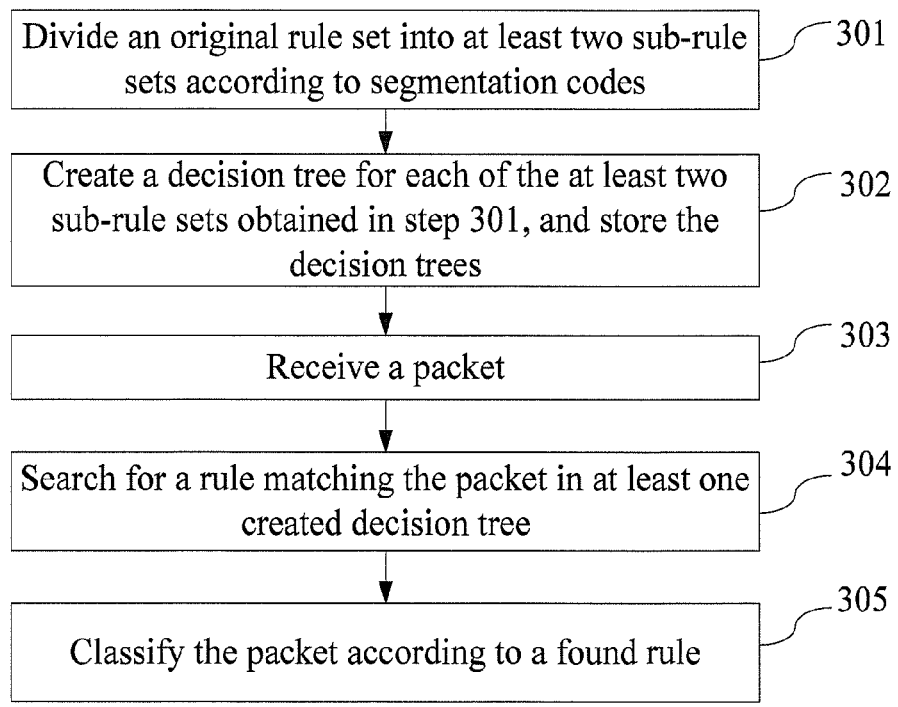
FIG. 3 is a flow chart of a method for classifying a packet in Embodiment 2 of the present invention.

In this embodiment, as shown in FIG. 3, the method for classifying the packet specifically includes the following steps:

Step 301: Divide an original rule set into at least two sub-rule sets according to segmentation codes.

To reduce duplication, and meanwhile to decrease the depth of the decision tree and shorten the time for tree creation, it is required to divide the original rule set into multiple sub-rule sets, and then a decision tree is created for the multiple sub-rule sets respectively.

Figure 4:
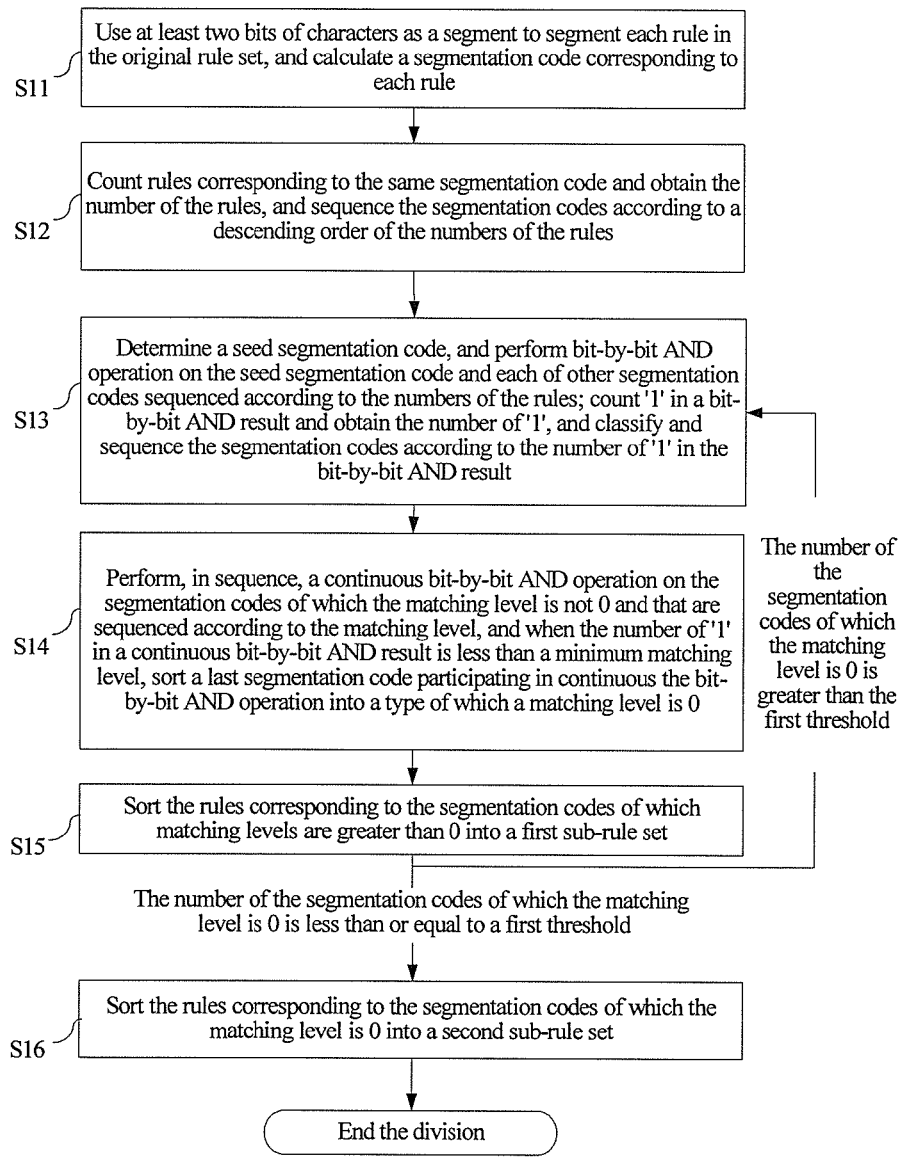
FIG. 4 is a flow chart of division of a rule set in Embodiment 2 of the present invention.

Specifically, a process of dividing the original rule set into at least two sub-rule sets according to the segmentation codes may be implemented by performing the following steps, as shown in FIG. 4.

S11: Use at least two bits of characters as a segment to segment each rule in the original rule set, and calculate a segmentation code corresponding to each rule.

If one rule in the original rule set is divided into N (N≥2) segments, a segmentation code corresponding to the rule is an N-bit binary code.

S12: After obtaining the segmentation code corresponding to each rule, count rules corresponding to a same segmentation code and obtain the number of the rules, and sequence segmentation codes according to a descending order of the numbers of rules.

In this step, definitely, the segmentation codes may also be sequenced according to an ascending order of the numbers of the rules corresponding to the segmentation codes, and the specific sequencing manner may be determined according to the requirements in an actual execution process.

S13: Select a segmentation code corresponding to the largest number of the rules among the segmentation codes sequenced according to the numbers of the rules as a seed segmentation code, and perform a bit-by-bit AND operation on the seed segmentation code and each of other segmentation codes sequenced according to the numbers of the rules; count '1' in a bit-by-bit AND result and obtain the number of '1', and classify and sequence the segmentation codes according to the number of '1' in the bit-by-bit AND result.

In step S13, the segmentation code corresponding to the largest number of the rules is selected as the seed segmentation code, so as to separate a large proportion of the rules as fast as possible. In this way, the seed segmentation code not only corresponds to a great number of rules, but also matches a relatively great number of segmentation codes generally.

It can be seen from the above description that, in a binary result obtained after the bit-by-bit AND operation on two segmentation codes, the number of '1' equals a matching level between the two segmentation codes. Then, in step S13, all the obtained segmentation codes are sequenced according to the matching level between each of other segmentation codes and the seed segmentation code. The matching level between the segmentation codes reflects a duplication trend during rule segmentation, that is, the higher the matching level is, the smaller the duplication trend during rule segmentation is; vice versa.

S14: Perform, in sequence, a continuous bit-by-bit AND operation on the segmentation codes of which the matching level is not 0 and that are sequenced according to the matching level, and when the number of '1' in a continuous bit-by-bit AND result is less than a minimum matching level, sort a last segmentation code participating in the continuous bit-by-bit AND operation into a type of which a matching level is 0.

The performing, in sequence, the continuous bit-by-bit AND operation on the segmentation codes of which the matching levels are not 0 refers to that, in the segmentation codes of which matching levels are not 0, the bit-by-bit AND operation is performed on a bit-by-bit AND result of all previous segmentation codes and a following segmentation code in sequence, till a bit-by-bit AND result of all the segmentation codes is obtained.

In the process of performing the continuous bit-by-bit AND operation in sequence, all the segmentation codes possibly enabling the number of '1' in the bit-by-bit AND result to be less than the minimum matching level are sorted into a type between which and the seed segmentation code the matching level is 0. Then, a final result obtained from the bit-by-bit AND operation on the remaining segmentation codes is a common matching segmentation code of all the segmentation codes in types between which and the seed segmentation code the matching levels are greater than 0.

In addition, the calculated common matching segmentation code of the segmentation codes each with a matching level greater than 0 should be stored.

In step S14, the minimum matching level $L_{min}$ may be calculated through the following formula:

$$L_{min} = \left\lceil \frac{1}{k-t} \log_2 \left( \frac{numRules}{f \times bucketSize} \right) \right\rceil$$

in which, the symbol "⌈ ⌉" represents rounding up; k is the number of characters corresponding to each binary bit of the segmentation code; t is the maximum number of wildcards included in a character segment applicable to rule segmentation after the segmentation, that is, a threshold of the number of '*' in characters in a segment; numRules is the number of the rules in the original rule set before the division; bucketSize is the largest number of the rules stored in leaf nodes of the decision tree; and f is average utilization efficiency of the leaf nodes in the decision tree, a precise value of which is very difficult to obtain before the decision tree is created, and therefore may be set according to an empirical value.

A minimum matching level of a rule set reflects the number of the bits for segmentation and not likely to cause duplication in the rule set. When fewer rules exist, fewer bits are required to segment the rules, and at this time, the minimum matching level may be set to be lower. When a large number of rules exist, many bits are required to segment the rules, and at this time, it is required to set the minimum matching level needs to be higher. For example, it is set that when the number of '*' in one segment exceeds 8, a bit corresponding to the segment is '0'. Assuming that in a rule set the minimum matching level between the rules is 1, a degree of the rule duplication is low when the rules are segmented by using bits less than 8. However, when it is required to perform segmentation by using more bits, the duplication may be increased. Such a problem may be solved by raising the minimum matching level of the rule set.

S15: Sort the rules corresponding to the segmentation codes of which matching levels are greater than 0 into a first sub-rule set.

Meanwhile, the common matching segmentation code of all the segmentation codes of which matching levels are greater than 0 that is obtained in step S14 and the minimum matching level may be stored as attributes of the first sub-rule set.

S16: When the number of the rules corresponding to the segmentation codes of which the matching level is 0 is less than or equal to a first threshold, sort the rules corresponding to the segmentation codes of which the matching level is 0 into a second sub-rule set, and end the further division of the rule set; and when the number of the rules corresponding to the segmentation codes of which the matching level is 0 is greater than the first threshold, re-select a segmentation code corresponding to the largest number of the rules from the multiple segmentation codes of which the matching level is 0, and return to step S13, so as to continue to divide all the segmentation codes of which the matching level is 0.

The first threshold may be, but not limited to, a multiple of the number of the rules admissible to each leaf node, for example, n*bucketSize, n≥2. When the number of the rules corresponding to the segmentation codes of which the matching level is 0 is less than or equal to n*bucketSize, it may be regarded that the number of the remaining rules is small at this time, and it may not be necessary to further divide the rule set.

If two thresholds are involved when it is judged whether the division of the rules can be ended, the sub-rule set into which the remaining segmentation codes of which the matching level is 0 should be sorted may be determined in the following manners.

Specifically, when the number of the rules corresponding to the segmentation codes of which the matching level is 0 is less than or equal to the first threshold and greater than the second threshold, in which the second threshold is less than the first threshold and may be but is not limited to the number of the rules admissible to each leaf node, the rules corresponding to the segmentation codes of which the matching level is 0 may be sorted into the second sub-rule set, so as to create different decision trees for different sub-rule sets, thereby decreasing the depth of each decision tree.

When the number of the rules corresponding to the segmentation codes of which the matching level is 0 is less than or equal to the second threshold, because the number of remaining rules corresponding to the segmentation codes of which the matching level is 0 is very small, the rules corresponding to the segmentation codes of which the matching level is 0 may be sorted into the first sub-rule set. The division scheme is applicable to the case in which the original rule set is small, and the depth of the decision tree created according to the first sub-rule set is not very large, which has a small effect on a searching rate in a classification process.

By using the above method, for the rule set in which the rules well match one another, division is not necessary or the number of the divided sub-rule sets is small. The rule set in which the rules poorly match one another may be divided into a large number of sub-rule sets. In this way, the rule set is divided according to the requirements.

In addition, the number of the sub-rule sets to be generated may be set in advance. For example, it may be set that the original rule set is divided into two sub-rule sets. In this way, in step S16, even if the number of the rules corresponding to the segmentation codes of which the matching level is 0 is greater than the first threshold, as long as the number of the generated sub-rule sets=the preset number of the sub-rule sets−1, the division of the rule set can be ended, and the rules of which the matching level is 0 are directly used as a new sub-rule set.

After step S11 to S16 are completed, the original rule set may be basically divided into at least two sub-rule sets.

In the process of dividing the original rule set into at least two sub-rule sets according to the segmentation codes, step S13 and step S14 may be combined, that is, the number of '1' in the bit-by-bit AND result obtained in step S13 is compared with the minimum matching level. Specifically, when the number of '1' in the bit-by-bit AND result in step S13 is less than the minimum matching level, a current segmentation code, on which and the seed segmentation code the bit-by-bit AND operation is performed, is sorted into a type of which a matching level is 0. At this time, it is equivalent to that only the matching level between each of other segmentation codes and the seed segmentation code is used as a judgment standard to divided the rule set.

302: Create a decision tree for each of the at least two sub-rule sets obtained in step 301, and store the decision trees.

During a process in which a router classifies a packet, it is unnecessary to perform step 301 and step 302 during each classification. As long as the router stores the decision trees created after the original rule set is divided based on the segmentation codes, the above two steps may be directly skipped in the subsequent classification process.

Step 303: Receive a packet.

The router may receive multiple packets from a network, and a traffic classifier then checks multiple domains in the packet, so as to search for a rule matching the packet.

Step 304: Search for a rule matching the packet in at least one created decision tree, in which the decision tree is a decision tree created after the original rule set is divided based on the segmentation codes in step 302.

Step 305: Classify the packet according to a found rule.

In step 305, it may be regarded that the packet matching the same rule all belong to the same type, and processing manners for packets of different types are different. For example, the processing may be discarding, accepting or counting.

In the method for classifying the packet provided in the embodiment of the present invention, the segmentation codes corresponding to different rules are determined, and the seed segmentation code is selected therefrom. Then, the segmentation codes are classified according to the matching level between each of other segmentation codes and the seed segmentation code and the preset minimum matching segmentation code, so as to implement the division of the original rule set, and further obtain at least two sub-rule sets and create at least two decision trees. Afterwards, the received packet may be classified according to the created decision trees. By using the method provided in this embodiment, especially in the process of dividing the original rule set by using the segmentation codes, not only the rule duplication may be reduced, and the bit selection may be performed accurately during the rule set segmentation, so as to greatly decrease the depth of the decision tree, the memory usage and the tree creation time and improve a processing speed of the division of the rule set, but also the rule searching time may be decreased and the classification efficiency may be improved during the classification of the packet.

Embodiment 3

To better understand the process of dividing the original rule set described in Embodiment 2, a specific example is given in this embodiment for illustration.

As shown in Table 3, an original rule set includes 10 two-dimensional rules, and each rule includes 8 bits, in which the rule is represented by a three-vale bit string formed by '0', '1' and '*'. Every 8 bits is set to be a segment, when the number of '*' in each segment exceeds 4, a code of the segment is '0'; otherwise, a code of the segment is '1'.

TABLE 3

| Rules | Dim_1 | Dim_2 | Segmentation codes |
|---|---|---|---|
| R1 | 10101*** | 00010*** | 11 |
| R2 | 11010*** | 11001*** | 11 |
| R3 | 00011*** | 0110**** | 11 |
| R4 | 1011**** | 1010**** | 11 |
| R5 | 01100*** | 101***** | 10 |
| R6 | 001***** | 10100*** | 01 |
| R7 | ******** | 01110*** | 01 |
| R8 | ******** | 10001*** | 01 |
| R9 | 11001*** | ******** | 10 |
| R10 | ******** | ******** | 00 |

In this embodiment, the conditions of ending the division of the original rule set is set as follows:
i) the original rule set is divided into at most two sub-rule sets;
ii) it is unnecessary to further perform the division when the number of rules of which the matching level is 0 in the sub-rule sets is less than or equal to 2; and
iii) when the number of rules of which the matching level is 0 is greater than 2 and less than or equal to 4, the rules of which the matching level is 0 in the sub-rule sets may be directly used as a new sub-rule set.

Because the number of the rules shown in Table 3 is small, the minimum matching level may be set to 1.

After the ending conditions are set, a method for dividing the rule set is as follows:

S21: Calculate a segmentation code of each rule shown in Table 3, in which a result is shown in the last column of Table 3.

S22: Sequence segmentation codes according to a descending order of the numbers of rules (as shown in Table 4).

TABLE 4

| | Segmentation codes | | | |
|---|---|---|---|---|
| | 11 | 01 | 10 | 00 |
| Number of rules | 4 | 3 | 2 | 1 |

S23: Because a segmentation code corresponding to the largest number of the rules among the segmentation codes is "11", the segmentation code "11" is used as a seed segmentation code, and all segmentation codes matching the segmentation code "11" are searched for; and meanwhile, classification is performed according to a matching level between each of other segmentation codes and the seed segmentation code "11" (as shown in Table 5).

TABLE 5

| Matching levels | 2 | 1 | 0 |
|---|---|---|---|
| Segmentation codes | 11 | 01, 10 | 00 |
| Number of rules | 4 | 5 | 1 |

S24: Perform a continuous bit-by-bit AND operation on the segmentation codes of which the matching levels are not 0 in Table in sequence, and when the number of '1' in the continuous bit-by-bit AND result is less than the minimum matching level, a last segmentation code participating in the continuous bit-by-bit AND operation is moved into a type of which the matching level is 0. As shown in Table 6, the segmentation codes 01 and 10 do not match, and the segmentation code 01 corresponds to more rules, so the bit-by-bit AND operation is first performed on the segmentation codes 01 and 11, and then a result 01 is obtained. Afterwards, the bit-by-bit AND operation is performed on the result 01 and the segmentation code 10, and the number of '1' in the result obtained after the bit-by-bit AND operation is performed for the second time is less than the minimum matching level 1. Therefore, the segmentation code 10 is moved into the type of which the matching level is 0.

TABLE 6

| Matching levels | 2 | 1 | 0 |
|---|---|---|---|
| Segmentation codes | 11 | 01 | 10, 00 |
| Number of rules | 4 | 3 | 3 |

S25: Sort the rules corresponding to the segmentation codes (11 and 01) of which the matching levels are greater than 0 into a rule set, and meanwhile record the common matching segmentation code thereof as 01.

S26: As shown in Table 6, the number of the rules of which the matching level is 0 is 3, which meets the condition iii), that is, when the number of rules of which the matching level is 0 is greater than 2 and less than or equal to 4, the rules of which the matching level is 0 in the sub-rule sets may be directly used as a new sub-rule set; therefore, the rules of which the matching level is 0 are sorted into a new sub-rule set.

The original rule set is divided by performing the above steps, so that the original rule set may be divided into two sub-rule sets. It can be known according to the common matching segmentation code (01) that, when the first sub-rule set is segmented by using the first 4 bits of the second dimension, no rule duplication occurs.

By using the solution provided in the embodiment of the present invention, the rule set is divided according to the segmentation codes to create the decision trees, and the effect of the number and position of wildcards '*' in each rule on the rule division can be taken into consideration at the same time, so that appropriate bits may be selected to segment the rules during the creation of the decision trees, thereby effectively reducing the rule duplication, shortening the tree creation time and improving the memory utilization.

Embodiment 4

Figure 5:
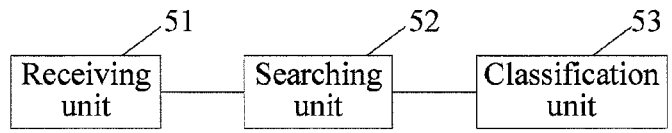
FIG. 5 is a schematic structural diagram of a device for classifying a packet in Embodiment 4 of the present invention.

Corresponding to the method for classifying the packet in Embodiment 1, the embodiment of the present invention provides a device for classifying a packet, and as shown in FIG. 5, the device includes:

a receiving unit 51, configured to receive a packet, in which the packet may be multiple packets from a network;

a searching unit 52, configured to search for a rule matching the packet in at least one created decision tree, in which the decision tree is a decision tree created after an original rule set is divided based on a segmentation code; and a classification unit 53, configured to classify the packet according to a found rule, in which the processing mentioned here may be operations required to be performed on packets of different kinds, such as discarding, accepting and counting.

The device for classifying the packet in this embodiment may be a router, or a traffic classification engine integrated inside the router.

In the device for classifying the packet provided by the embodiment of the present invention, because the decision tree used in the rule searching process is a decision tree created after the original rule set is divided based on the segmentation code, the use of the segmentation code to divide the rule set may not only reduce the rule duplication, but also greatly decrease the depth of the decision tree, memory usage and tree creation time. Therefore, when the rule is searched for by using the solution provided by the embodiment of the present invention, the speed of the processing such as searching and classifying may be greatly improved with searching bandwidth remaining unchanged.

Embodiment 5

The device for classifying the packet provided in the embodiment of the present invention is described in detail below through a specific embodiment.

Figure 6:
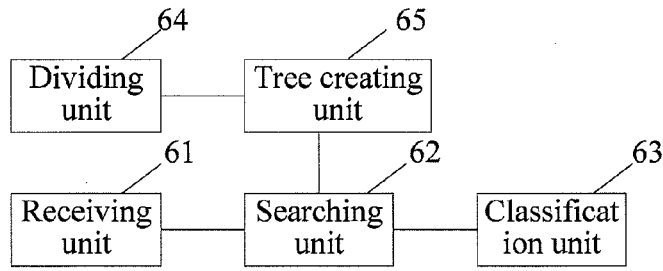
FIG. 6 is a schematic structural diagram of a device for classifying a packet in Embodiment 5 of the present invention.

In this embodiment, as shown in FIG. 6, the device for classifying the packet includes: a receiving unit 61, a searching unit 62, a classification unit 63, a dividing unit 64 and a tree creating unit 65.

The dividing unit 64 is configured to divide an original rule set into at least two sub-rule sets according to a segmentation code, in which the segmentation code refers to an N-bit binary code representing the rules and determined according to the number of wildcards '*' in each segment after one rule is divided into N (N≥2) segments, reference may be made to the description in Embodiment 2 for the specific determination manner, and the details are not described herein again.

The tree creating unit 65 is configured to create a decision tree for each of the at least two sub-rule sets obtained through division by the dividing unit 64, so as to enable the searching unit 62 to search for the rule during packet classification.

In addition, the receiving unit 61 is configured to receive the packet, in which the packet may be multiple packets received by a router from a network.

The searching unit 62 is configured to search for a rule matching the packet in at least one created decision tree, in which the decision tree is a decision tree created after the original rule set is divided based on the segmentation code.

The classification unit 63 is configured to classify the packet according to a found rule, in which the processing mentioned here may be operations required to be performed on packets of different kinds, such as discarding, accepting and counting.

Figure 7:
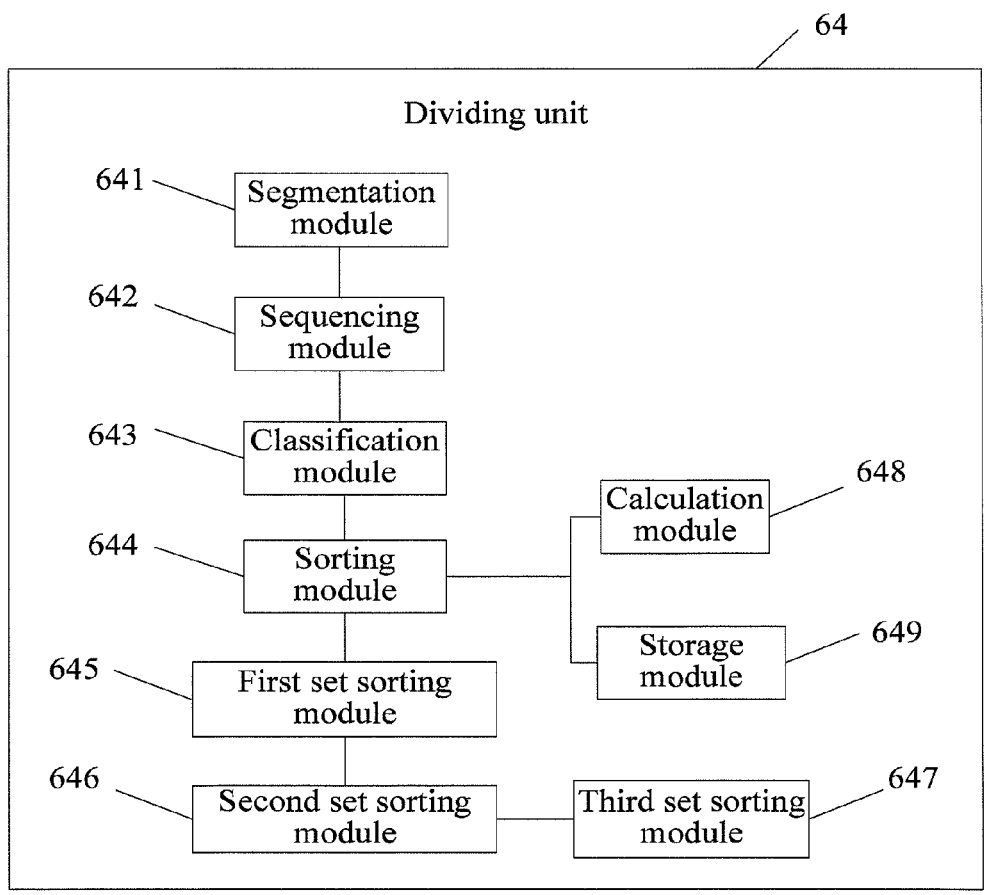
FIG. 7 is a schematic structural diagram of a dividing unit in Embodiment 5 of the present invention.

In this embodiment, as shown in FIG. 7, the dividing unit 64 may be implemented in the following manners.

Specifically, the dividing unit 64 includes: a segmentation module 641, a sequencing module 642, a classification module 643, a sorting module 644, a first set sorting module 645, a second set sorting module 646, a third set sorting module 647, a calculation module 648, and a storage module 649.

The segmentation module 641 is configured to use at least two bits of characters as a segment to segment each rule in the original rule set, and calculate a segmentation code corresponding to each rule.

The sequencing module 642 is configured to count rules corresponding to a same segmentation code and obtain the number of the rules, and sequence segmentation codes according to a descending order of the numbers of rules.

The classification module 643 is configured to select a segmentation code corresponding to the largest number of the rules, perform a bit-by-bit AND operation on the selected segmentation code and each of other segmentation codes sequenced according to the numbers of the rules, use the number of '1' in a bit-by-bit AND result as a matching level to sequence segmentation codes according to a descending order of the matching levels.

The sorting module 644 is configured to perform, in sequence, a continuous bit-by-bit AND operation on the segmentation codes of which the matching level is not 0 and that are sequenced according to the matching level, and when the number of '1' in a continuous bit-by-bit AND result is less than a minimum matching level, sort a last segmentation code participating in the bit-by-bit AND operation into a type of which a matching level is 0.

The first set sorting module 645 is configured to sort the rules corresponding to the segmentation codes of which matching levels are greater than 0 into a first sub-rule set.

The second set sorting module 646 is configured to, when the number of the rules corresponding to the segmentation codes of which the matching level is 0 is less than or equal to a first threshold, sort the rules corresponding to the segmentation codes of which the matching level is 0 into a second sub-rule set; and when the number of the rules corresponding to the segmentation codes of which the matching level is 0 is greater than the first threshold, re-select a segmentation code corresponding to the largest number of the rules from the multiple segmentation codes of which the matching level is 0 through the dividing unit 64, especially through the classification module 643, the sorting module 644, the first set sorting module 645 and the second set sorting module 646 in the dividing unit 64, so as to complete the further division of the segmentation codes of which the matching level is 0.

If it is required to limit the division of the sub-rule sets more specifically, a second threshold less than the first threshold may be introduced. At this time, the second set sorting module 646 is specifically configured to, when the number of the rules corresponding the segmentation codes of which the matching level is 0 is less than or equal to the first threshold, and greater than a second threshold, sort the rules corresponding to the segmentation codes of which the matching level is 0 into the second sub-rule set.

At this time, the dividing unit 64 further includes the third set sorting module 647. The third set sorting module 647 is configured to, when the number of the rules corresponding to the segmentation codes of which the matching level is 0 is less than or equal to the second threshold, sort the rules corresponding to the segmentation codes of which the matching level is 0 into the first sub-rule set.

Further, the minimum matching level used when the sorting module 644 sorts the segmentation codes may be obtained through calculation by the calculation module 648. Specifically, the calculation module 648 is configured to calculate the minimum matching level through the following formula:

$$L_{min} = \left\lceil \frac{1}{k-t} \log_2 \left( \frac{numRules}{f \times bucketSize} \right) \right\rceil$$

in which, Lmin is the minimum matching level, the symbol "⌈ ⌉" represents rounding up; k is the number of characters corresponding to each binary bit of the segmentation code; t is the maximum number of wildcards included in a character segment applicable to rule segmentation after the segmentation; numRules is the number of the rules in the original rule set before the division; bucketSize is the largest number of the rules stored in leaf nodes of the decision tree; and f is average utilization efficiency of the leaf nodes in the decision tree.

In addition, the dividing unit 64 further includes the storage module 649. The storage module 649 is configured to calculate and store a bit-by-bit AND result obtained after the continuous bit-by-bit AND operation is performed in sequence on the segmentation codes of which the matching levels are greater than 0 after the sorting processing by the sorting module 644, that is, a common matching segmentation code of the segmentation codes of which the matching levels are greater than 0 after the sorting processing by the sorting module 644.

For the process of classifying the packet through the device in this embodiment, reference may be made to the description in Embodiment 2 and the details are not described herein again.

In the device for classifying the packet provided in the embodiment of the present invention, the segmentation codes corresponding to different rules are determined, and a seed segmentation code is selected from the segmentation codes. Then, the segmentation codes are classified according to the matching level between each of other segmentation codes and the seed segmentation code and the preset minimum matching segmentation code, so as to implement the division of the original rule set, and further obtain at least two sub-rule sets and create at least two decision trees. Afterwards, the received packet may be classified according to the created decision trees. Through the device provided in this embodiment, especially, especially through the division of the original rule set based on the segmentation codes, not only the rule duplication may be reduced, and the bit selection may be performed accurately during the rule set segmentation, so as to greatly decrease the depth of the decision tree, the memory usage and the tree creation time and improve a processing speed of the division of the rule set, but also the rule searching time may be decreased and the classification efficiency may be improved during the classification of the packet.

In addition, the method and the device for classifying the packet provided in the embodiment of the present invention may further support incremental update. The involved incremental update refers to that, after the original rule set is divided into multiple sub-rule sets, when it is required to add or delete some rules, by using the method based on the segmentation codes, it is not required to re-divide the divided sub-rule sets, and it is merely required to classify the newly added rules into an appropriate sub-rule set, or delete the old rules from a certain sub-rule set.

When a rule is newly added, a segmentation code of the rule is first calculated, and a matching level between the segmentation code and a common matching segmentation code of each sub-rule set is calculated according to a generation order of the multiple sub-rule sets. When the matching level between the segmentation code of the newly added rule and a common matching segmentation code of a certain sub-rule set is greater than or equal to the minimum matching level of the sub-rule set, the newly added rule is added into the sub-rule set.

During the deletion of a rule, a segmentation code of the rule is first calculated, and then it is judged which sub-rule set the rule belongs to according to the common matching segmentation code and the minimum matching level of each sub-rule set, and the rule is deleted from the sub-rule set. After the rule is deleted from a certain sub-rule set, when the number of the rules included in the sub-rule set is less than a certain threshold, the sub-rule set is combined with other sub-rule sets, in which the threshold may be set according to actual requirements in an actual process.

By dividing the rule set by using the method based on the segmentation codes, the sub-rule sets may be flexibly updated, in which the update includes the adding of a new rule into the sub-rule set or the deletion of an old rule from the sub-rule set. Compared with the prior art, the method based on the segmentation codes greatly reduces the update time and the memory usage caused by the update.

When multiple rules exist and the division of the rules is difficult, a solution in which software and hardware are combined may be adopted. The rules that are easy to be divided are processed through the software, and the rules that are difficult to be divided are placed in a TCAM (Ternary Content Addressable Memory, ternary content addressable memory) for processing. However, because TCAM has low integration and storage efficiency and high power consumption, the rules not matching other rules are placed in the TCAM for processing, and shall be placed as few as possible, so as to reduce the use of the TCAM.

In the solution provided in the embodiment of the present invention, through the division of the original rule set based on the segmentation codes, a large proportion of the rules can be separated as fast as possible, and moreover, because the method based on the segmentation codes ensures the matching among the rules, the separated rules are easily divided through software, and the remaining few rules difficult to divide may be placed in the TCAM, thereby improving algorithm performance and saving a space of the TCAM.

Through the above description of the implementation, it is clear to persons skilled in the art that the present invention may be accomplished through software plus necessary universal hardware or through hardware. But in many cases, the software implementation is preferred. Based on this, the above technical solutions or the part that makes contributions to the prior art can be substantially embodied in the form of a software product. The computer software product may be stored in a computer readable storage medium such as a floppy disk, a hard disk, or an optical disk of a computer, and contain several instructions to instruct computer equipment (for example, a personal computer, a server, or network equipment) to perform the method described in the embodiments of the present invention.

The above descriptions are merely specific embodiments of the present invention, but the protection scope of the present invention is not limited thereto. Any modification or replacement is easily figured out by persons skilled in the art without departing from the technical scope of the present invention should fall within the protection scope of the present invention. Therefore, the protection scope of the present invention is subject to the protection scope of the claims.

What is claimed is:

1. A method for classifying a packet, the method comprising:
   receiving a packet;
   searching for a rule matching the packet in at least one created decision tree, wherein the decision tree is a decision tree created after an original rule set is divided based on a segmentation code; and
   classifying the packet according to a found rule;
   wherein before searching for the rule matching the packet in the at least one created decision tree, the method further comprises:
      dividing the original rule set into at least two sub-rule sets according to the segmentation code; and
      creating a decision tree for each of the sub-rule sets; and
   wherein dividing the original rule set into the at least two sub-rule sets according to the segmentation code comprises:
      using at least two bits of characters as a segment to segment each rule in the original rule set, and calculating a segmentation code corresponding to each rule;
      counting rules corresponding to a same segmentation code and obtaining the number of the rules, and sequencing segmentation codes according to a descending order of the numbers of rules;
      selecting a segmentation code corresponding to a largest number of the rules, performing, in sequence, a bit-by-bit AND operation on the selected segmentation code and each of other segmentation codes sequenced according to the numbers of the rules, using the number of '1' a bit-by-bit AND result as a matching level to classify and sequence the segmentation codes;
      performing, in sequence, a continuous bit-by-bit AND operation on the segmentation codes of which the matching level is not 0 and that are sequenced according to the matching level, and when the number of '1' in a continuous bit-by-bit AND result is less than a minimum matching level, sorting a last segmentation code participating in the continuous bit-by-bit AND operation into a type of which a matching level is 0;
      sorting rules corresponding to the segmentation codes of which matching levels are greater than 0 into a first sub-rule set; and
      when the number of the rules corresponding to the segmentation codes of which a matching level is 0 is less than or equal to a first threshold, sorting the rules corresponding to the segmentation codes of which the matching level is 0 into a second sub-rule set; and
      when the number of the rules corresponding to the segmentation codes of which the matching level is 0 is greater than the first threshold, re-selecting a segmentation code corresponding to a largest number of the rules from the multiple segmentation codes of which the matching level is 0, and repeating the above steps to continuously divide the segmentation codes of which the matching level is 0.

2. The method for classifying a packet according to claim 1, wherein after the performing, in sequence, the bit-by-bit AND operation on the segmentation codes of which matching levels are not 0 and that are sequenced according to the matching levels, the method further comprises:
   calculating and storing a bit-by-bit AND result obtained after the continuous bit-by-bit AND operation is performed on the segmentation codes of which matching levels are greater than 0 in sequence.

3. The method for classifying a packet according to claim 1, wherein,
   when the number of the rules corresponding to the segmentation codes of which the matching level is 0 is less than or equal to the first threshold, the sorting the rules corresponding to the segmentation codes of which the matching level is 0 into the second sub-rule set comprises: when the number of the rules corresponding to the segmentation codes of which the matching level is 0 is less than or equal to the first threshold and greater than a second threshold, sorting the rules corresponding to the segmentation codes of which the matching level is 0 into the second sub-rule set, wherein the first threshold is greater than the second threshold;
   the dividing the original rule set into the at least two sub-rule sets according to the segmentation code further comprises:
   when the number of the rules corresponding to the segmentation codes of which the matching level is 0 is less than or equal to the second threshold, sorting the rules corresponding to the segmentation codes of which the matching level is 0 into the first sub-rule set.

4. The method for classifying a packet according to claim 1, wherein the minimum matching level is calculated through the following formula:

$$L_{min} = \left\lceil \frac{1}{k-t} \log_2 \left( \frac{numRules}{f \times bucketSize} \right) \right\rceil$$

wherein, $L_{min}$ is the minimum matching level; k is the number of characters corresponding to each binary bit of the segmentation code; t is a maximum number of wildcards comprised in a character segment applicable to rule segmentation after the segmentation; numRules is the number of rules in the original rule set before the division; bucketSize is a largest number of rules stored in leaf nodes of the decision tree; and f is average utilization efficiency of the leaf nodes in the decision tree.

5. A device for classifying a packet, the device comprising a processor and software including instructions stored on a computer readable storage medium, wherein when the instructions are executed by the processor, the device is configured to comprise:
   a receiving unit, configured to receive a packet;
   a searching unit, configured to search for a rule matching the packet in at least one created decision tree, wherein the decision tree is a decision tree created after an original rule set is divided based on a segmentation code;

a classification unit, configured to classify the packet according to a found rule;
a dividing unit, configured to divide the original rule set into the at least two sub-rule sets according to the segmentation code;
a tree creating unit, configured to create a decision tree for each of the sub-rule sets, so as to enable the searching unit to search for the rule; and
wherein the dividing unit comprises:
 a segmentation module, configured to use at least two bits of characters as a segment to segment each rule in the original rule set, and calculate a segmentation code corresponding to each rule;
 a sequencing module, configured to count rules corresponding to a same segmentation code and obtain the number of the rules, and sequence segmentation codes according to a descending order of the numbers of rules;
 a classification module, configured to select a segmentation code corresponding to a largest number of the rules, perform, in sequence, a bit-by-bit AND operation on the selected segmentation code and each of other segmentation codes sequenced according to the numbers of the rules, use the number of '1' in a bit-by-bit AND result as a matching level to classify and sequence the segmentation codes;
 a sorting module, configured to perform, in sequence, a continuous bit-by-bit AND operation on the segmentation codes of which the matching level is not 0 and that are sequenced according to the matching level, and when the number of '1' in a continuous bit-by-bit AND result is less than a minimum matching level, sort a last segmentation code participating in the continuous bit-by-bit AND operation into a type of which a matching level is 0;
 a first set sorting module, configured to sort rules corresponding to the segmentation codes of which matching levels are greater than 0 into a first sub-rule set; and
 a second set sorting module, configured to, when the number of the rules corresponding to the segmentation codes of which the matching level is 0 is less than or equal to a first threshold, sort rules corresponding to the segmentation codes of which a matching level is 0 into a second sub-rule set.

6. The device for classifying a packet according to claim 5, wherein,
the dividing unit is further configured to, when the number of the rules corresponding to the segmentation codes of which the matching level is 0 is greater than the first threshold, re-select a segmentation code corresponding to a largest number of the rules from the multiple segmentation codes of which the matching level is 0, so as to continuously divide the segmentation codes of which the matching level is 0.

7. The device for classifying a packet according to claim 5, further comprising:
a storage module, configured to calculate and store a bit-by-bit AND result obtained after the continuous bit-by-bit AND operation is performed in sequence on the segmentation codes of which the matching levels that are greater than 0 after the sorting processing by the sorting module.

8. The device for classifying a packet according to claim 5, wherein,
the second set sorting module is configured to, when the number of the rules corresponding to the segmentation codes of which the matching level is 0 is less than or equal to the first threshold, and greater than a second threshold, sort the rules corresponding to the segmentation codes of which the matching level is 0 into a second sub-rule set; wherein the first threshold is greater than the second threshold; and
the dividing unit further comprises:
a third set sorting module, configured to, when the number of the rules corresponding to the segmentation codes of which the matching level is 0 is less than or equal to the second threshold, sort the rules corresponding to the segmentation codes of which the matching level is 0 into the first sub-rule set.

9. The device for classifying a packet according to claim 5, further comprising:
a calculation module, configured to calculate the minimum matching level through the following formula:

$$L_{min} = \left\lceil \frac{1}{k-1} \log_2\left(\frac{numRules}{f \times bucketSize}\right) \right\rceil$$

wherein, $L_{min}$ is the minimum matching level; k is the number of characters corresponding to each binary bit of the segmentation code; t is a maximum number of wildcards comprised in a character segment applicable to rule segmentation after the segmentation; numRules is the number of rules in the original rule set before the division; bucketSize is a largest number of rules stored in leaf nodes of the decision tree; f is average utilization efficiency of the leaf nodes in the decision tree.

10. A computer program product stored on a non-transitory computer readable medium and comprising computer executable instructions which, when executed, configure computer equipment to:
receive a packet;
search for a rule matching the packet in at least one created decision tree, wherein the decision tree is a decision tree created after an original rule set is divided based on a segmentation code;
classify the packet according to a found rule;
wherein before the search step, the computer executable instructions when executed further configure the computer equipment to:
divide the original rule set into the at least two sub-rule sets according to the segmentation code;
create a decision tree for each of the sub-rule sets, so as to enable searching for the rule;
wherein the divide step comprises:
 use at least two bits of characters as a segment to segment each rule in the original rule set, and calculate a segmentation code corresponding to each rule,
 count rules corresponding to a same segmentation code and obtain the number of the rules, and sequence segmentation codes according to a descending order of the numbers of rules,
 select a segmentation code corresponding to a largest number of the rules, perform, in sequence, a bit-by-bit AND operation on the selected segmentation code and each of other segmentation codes sequenced according to the numbers of the rules, use the number of '1' in a bit-by-bit AND result as a matching level to classify and sequence the segmentation codes,
 perform, in sequence, a continuous bit-by-bit AND operation on the segmentation codes of which the matching level is not 0 and that are sequenced according to the matching level, and when the number of '1' in a continuous bit-by-bit AND result is less than a minimum matching level, sort a last segmentation code participating in the continuous bit-by-bit AND operation into a type of which a matching level is 0, sort rules corresponding to the segmentation codes of which matching levels are greater than 0 into a first sub-rule set, and when the number of the rules corresponding to the segmentation codes of which the matching level is 0 is less than or equal to a first threshold, sort rules corresponding to the segmentation codes of which a matching level is 0 into a second sub-rule set.

11. The computer program product according to claim 10, wherein the computer executable instructions when executed further configure the computer equipment to:

when the number of the rules corresponding to the segmentation codes of which the matching level is 0 is greater than the first threshold, re-select a segmentation code corresponding to a largest number of the rules from the multiple segmentation codes of which the matching level is 0, so as to continuously divide the segmentation codes of which the matching level is 0.

12. The computer program product according to claim 10, wherein the computer executable instructions when executed further configure the computer equipment to:

calculate and store a bit-by-bit AND result obtained after the continuous bit-by-bit AND operation is performed in sequence on the segmentation codes of which the matching levels that are greater than 0 after sorting.

13. The computer program product according to claim 10, wherein the computer executable instructions when executed further configure the computer equipment to:

when the number of the rules corresponding to the segmentation codes of which the matching level is 0 is less than or equal to the first threshold, and greater than a second threshold, sort the rules corresponding to the segmentation codes of which the matching level is 0 into a second sub-rule set; wherein the first threshold is greater than the second threshold; and when the number of the rules corresponding to the segmentation codes of which the matching level is 0 is less than or equal to the second threshold, sort the rules corresponding to the segmentation codes of which the matching level is 0 into the first sub-rule set.

14. The computer program product according to claim 10, wherein the computer executable instructions when executed further configure the computer equipment to:

calculate the minimum matching level through the following formula:

$$L_{min} = \left\lceil \frac{1}{k-t} \log_2\left(\frac{numRules}{f \times bucketSize}\right) \right\rceil$$

wherein, $L_{min}$ is the minimum matching level; k is the number of characters corresponding to each binary bit of the segmentation code; t is a maximum number of wildcards comprised in a character segment applicable to rule segmentation after the segmentation; numRules is the number of rules in the original rule set before the division; bucketSize is a largest number of rules stored in leaf nodes of the decision tree; f is average utilization efficiency of the leaf nodes in the decision tree.

* * * * *